United States Patent [19]

Downs

[11] Patent Number: 5,629,668

[45] Date of Patent: May 13, 1997

[54] DATA DISPLAY UNIT FOR A BICYCLE

[75] Inventor: Robert M. Downs, Madison, Wis.

[73] Assignee: Trek Bicycle, Corp., Waterloo, Wis.

[21] Appl. No.: 288,399

[22] Filed: Aug. 10, 1994

[51] Int. Cl.[6] ............................................. B62J 2/00
[52] U.S. Cl. .......................... 340/432; 340/627; 462/57
[58] Field of Search ............................ 340/432, 427, 340/438; 324/174; 482/51, 57, 902; 364/551.01, 557, 561

[56] References Cited

U.S. PATENT DOCUMENTS

| | | | |
|---|---|---|---|
| 4,633,216 | 12/1986 | Tsuyama | 340/140 |
| 4,636,769 | 1/1987 | Tsuyama | 340/134 |
| 4,862,395 | 8/1989 | Fey et al. | 364/561 |
| 4,881,187 | 11/1989 | Read | 364/565 |
| 5,416,728 | 5/1995 | Rudzewicz et al. | 364/557 |

*Primary Examiner*—Jeffery Hofsass
*Assistant Examiner*—Julie B. Lieu
*Attorney, Agent, or Firm*—Lee, Mann, Smith, McWilliams, Sweeney & Ohlson

[57] ABSTRACT

A data display unit for a bicycle includes a means for determining and displaying an operational data signal in a normal operating mode and a workout data signal of a workout window mode having predetermined data information including time, distance, average and maximum speed. The unit is configured to calculate and display the predetermined information of the operational data signal information and to allow for the manual actuation to begin separate calculation, display and resetting of the predetermined information of the workout data signal. The display includes a liquid crystal display for displaying separately operational data signals and workout data signals.

26 Claims, 3 Drawing Sheets

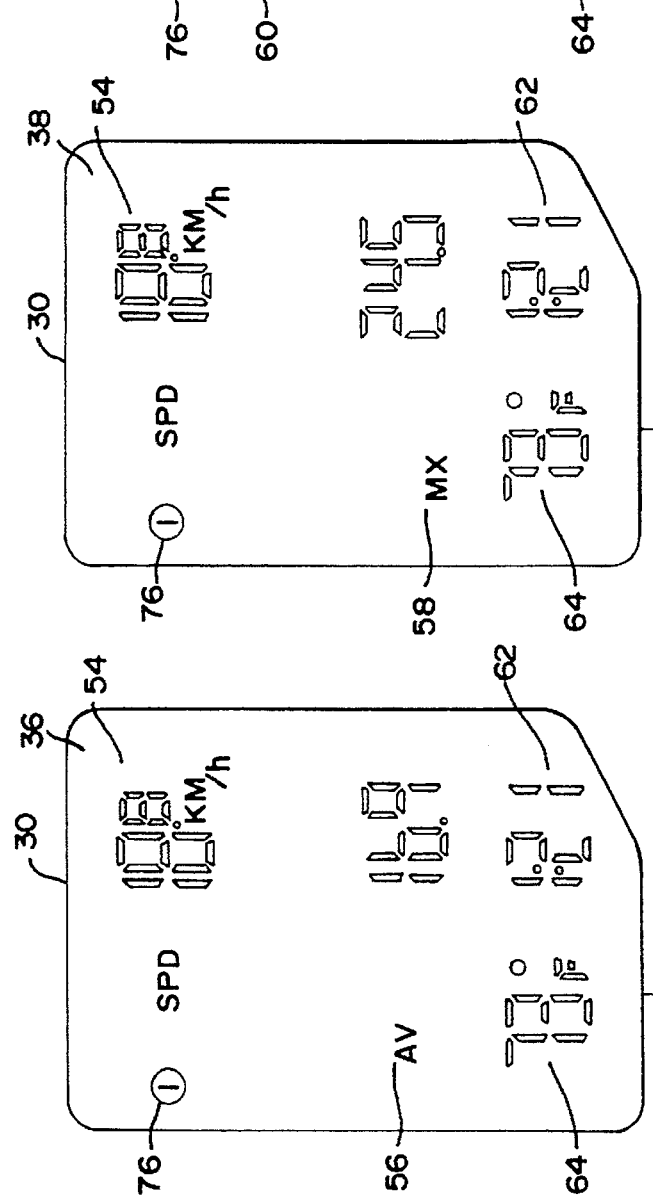

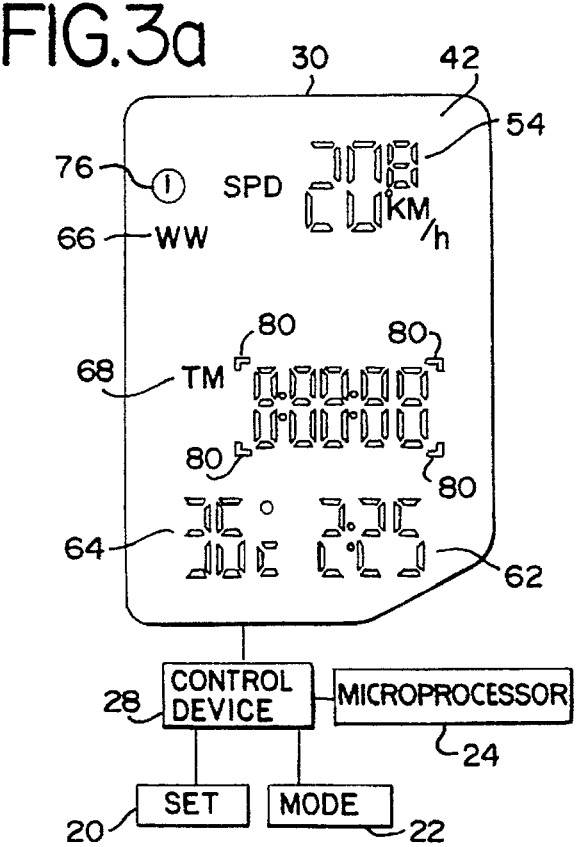
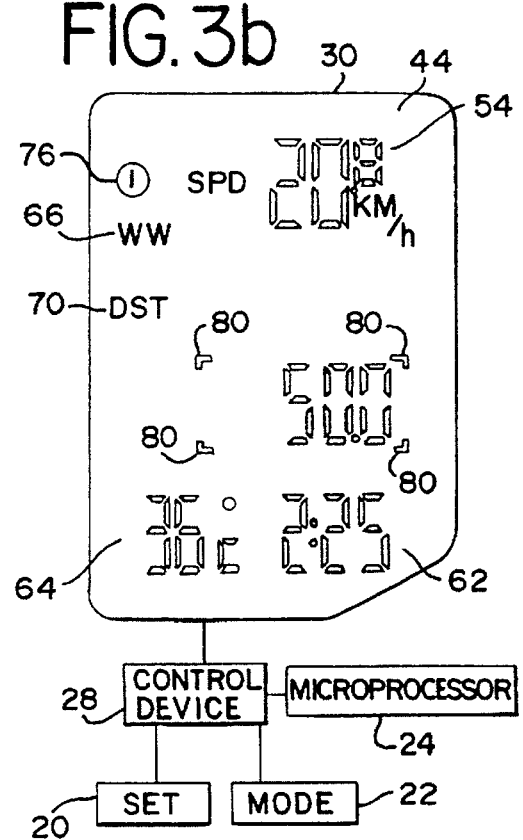
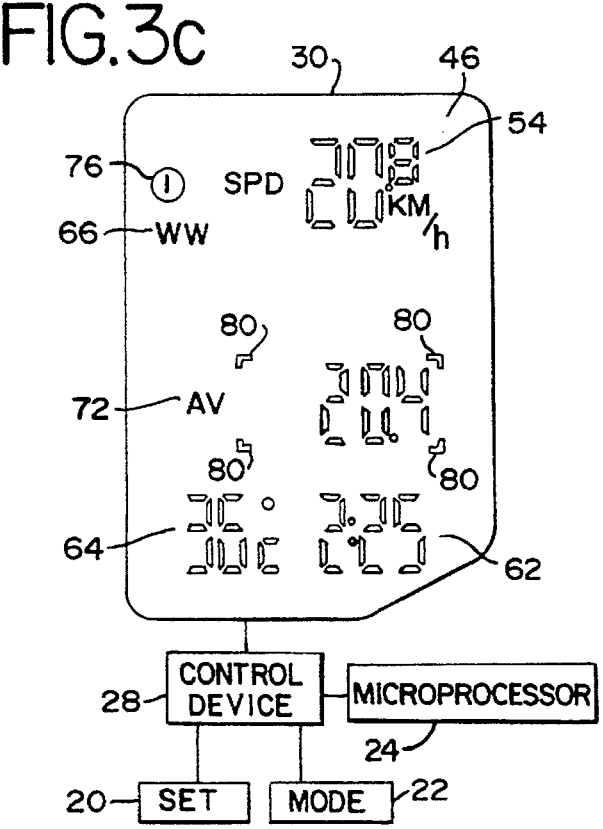
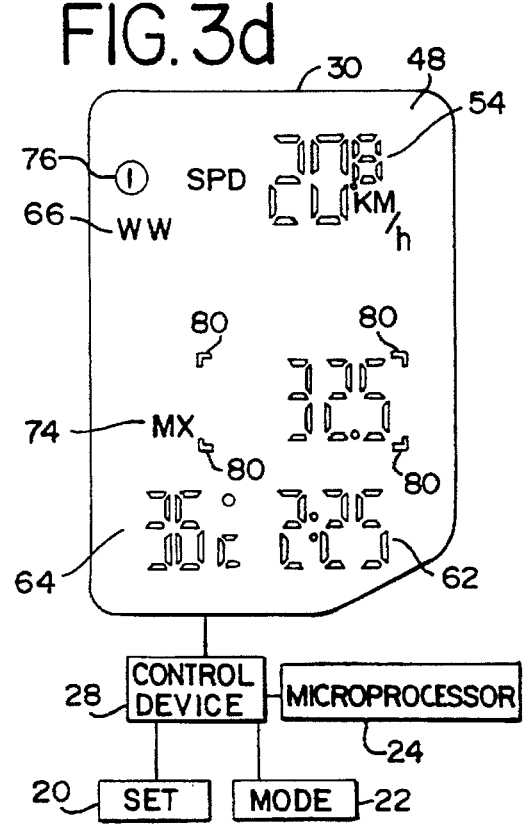

DATA DISPLAY UNIT FOR A BICYCLE

BACKGROUND OF THE INVENTION

1. Field of the Invention

The present invention relates to a data display unit for a bicycle and more particularly to a unit having a means for computing and displaying a second set of workout data.

2. Description of the Prior Art

Conventional data display units for bicycles can display data information of time, speed and distance when the bicycle is in motion. A microprocessor computes the data information as a function of impulse signals generated by a wheel and/or a pedal revolution sensor. The data information is displayed using a liquid crystal display (LCD). Buttons can be provided for changing, selecting and viewing values of the operational data information computed and stored in the memory of the computer.

There are problems and limitations with all of these conventional data display units. Data display units have disadvantages as these units are configured conventionally to continuously compute and display the operational data information while the bicycle is in motion. Conventional display units provide inaccurate cyclist's data by not providing a means for separately determining true workout performance for a predetermined period of a time of a cyclist's workout. Simply, the operational data is computed and displayed from the time the bicycle is in motion. Thus, the operational data computed prior to the cyclist's workout can diminish a measure of the true workout performance for the predetermined period, for example, factors of stopping, starting, warming up, cooling down and the like. Other disadvantages include not being able to display workout data information of time, distance and speed when the unit is collecting operational data. Conventional units can be reset to begin collecting new operational data, however, resetting the unit completely eliminates the existing operational data from that point onward, whereby, in the end, only an estimate of cumulative operational data can be made. Thus, it cannot be said that such conventional display units are satisfactory and effective for determining the cyclist's performance of a particular workout.

Therefore, a need exists for a data display unit that provides accurate workout data, display of the cyclist's workout performance and an improved measure of true performance. A need exists for being able to reset the workout data without resetting collected operating data of the data display unit. The present invention provides a data display unit that controls the calculating and displaying of separate operating and workout data signals.

SUMMARY OF THE INVENTION

It is an object of the present invention to provide a data display device for a bicycle that overcomes the disadvantages of conventional data display devices.

Another object of the present invention is to provide a data display device for controlling, computing and displaying operational and workout data signals thereby improving the accuracy of data relating to a cyclist's performance.

It is another object of the present invention to provide a data display device which can reset the workout data without resetting the operational data.

In brief, the present invention provides a data display unit for a bicycle that has a wheel rotation sensor for generating plural pulse signals at a rate corresponding to the rotary speed of a wheel of the bicycle. The sensor supplies the pulse signals to a computing device which is responsive to the pulse signal for generating an operational data signal and a workout data signal of a plurality of predetermined information when the pulse rate is greater than zero. The computing device is adapted to generate the workout data signal independent of generating the operational data signal. The unit includes a visual display device for displaying the predetermined information of the operational data and workout data signals. The display has a plurality of screens for displaying the predetermined information in a plurality of display fields. A control device controls the computing and display devices, whereby the control device is adapted to control the computer to generate separately the operational and workout data signals, and is adapted to control the display by separately displaying the operational and workout data signals.

BRIEF DESCRIPTION OF THE DRAWINGS

FIGS. 2a, 2b, 2c, 2d, and 2e, are schematic front views of the data display unit of FIG. 1 illustrating the displaying of operational data in screens of the present invention; and FIGS. 3a, 3b, 3c and 3d, are schematic front views illustrating the displaying of workout data in screens of the data display unit of FIG. 1.

DETAILED DESCRIPTION OF THE PREFERRED EMBODIMENTS

Figure 1:
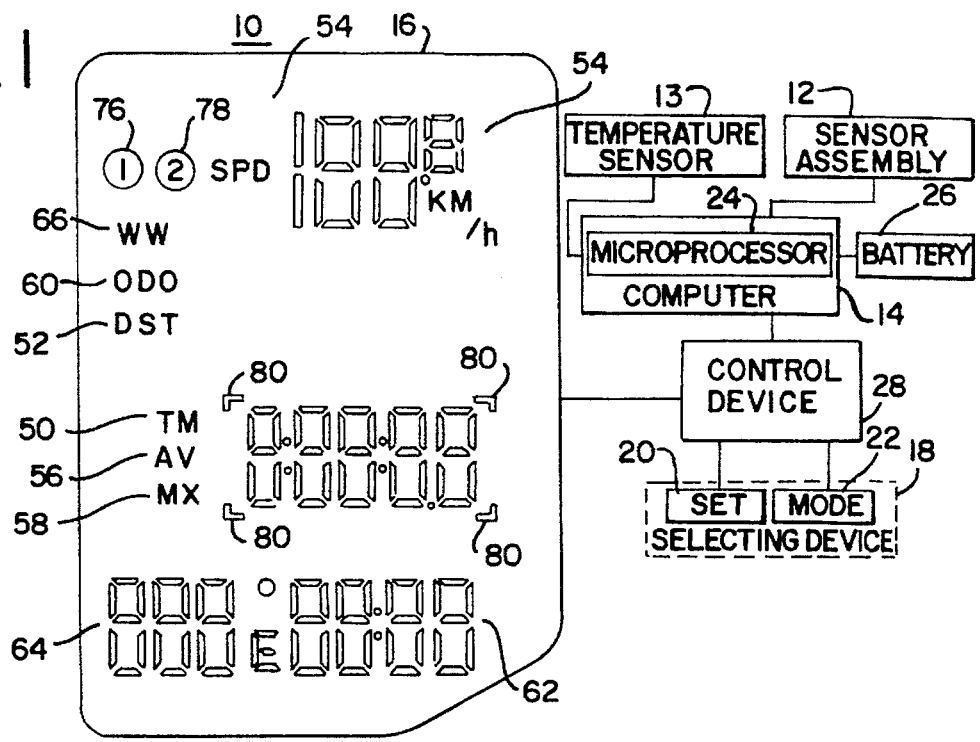
FIG. 1 is a front view illustrating a data display unit according to an embodiment of the present invention.

As shown in FIG. 1, the data display unit for a bicycle is shown generally as 10. The unit 10 has a sensor assembly 12, a computer 14, a display 16, and selecting device 18 which can be, for example, a set button 20 and a mode button 22. The sensor assembly 12 transmits a pulse signal from the sensor to the computer 14 by a wire or the like. The sensor assembly 12 can be conventionally configured to sense wheel and/or pedal rotation of the bicycle, preferably using contactless sensing, thereby generating a pulse signal for each rotation and establishing a pulse rate which is proportional to the rotary speed of the wheel and/or pedal. For example, the sensor assembly 12 can have a sensor positioned inside of the fork or frame and a wheel magnet attached to a spoke of the wheel (not shown). The magnet is aligned with the sensor so as to face and intersect a top polished line of ridges on the sensor, thereby generating the pulse signal for each revolution. The unit 10 is configured to automatically turn on and record dam, in a normal operating mode, whenever the wheel sensor is activated by wheel rotation and to stop recording data when the wheel stops rotating.

The data display unit 10 can be removably attached to the handlebar of the bicycle by a mounting bracket so as to allow for removing the unit 10 when it is so desired. The computer 14 has a microprocessor 24 powered by a source of electricity such as a battery 26, which can be installed and replaced in the unit by removing a cover from the back of the unit. In response to the pulse signal and rate, the microprocessor 24 computes, using in part a distance that the wheel travels in one rotation stored in memory, a plurality of data signals for desired information such as the actual or current traveling speed and the like.

Generally, the data signal is fed from the microprocessor 24 of the computer 14 via a control device 28 to a visual display device 30, which is configured to display multiple screens 32, 34, 36, 38, and 40, as shown in FIGS. 2a–2e, and screens 42, 44, 46, and 48, as shown in FIGS. 3a–3d. The control device 28 may be part of the computer 14 or a program thereof. The computer 14 of the present invention is configured to provide a plurality of operational data signals and workout data signals representing predetermined information when the pulse signal is received. The operational data signals and workout data signals are independently fed from the microprocessor 24 to the control device 28. The control device 28 supplies the operational data signal to screens 32, 34, 36, 38, and 40, and the workout data signal to screens 42, 44, 46, and 48. Generally, the display 30 displays the predetermined information in a plurality of display fields of a trip timer 50, a trip distance 52, a current speed 54, an average speed 56, a maximum speed 58, an odometer 60, a time of day (TOD) clock 62, a temperature 64, a workout window ("WW") symbol 66, a workout timer 68, a workout distance 70, a workout average speed 72, a workout maximum speed 74, and two wheel size settings 76 and 78, which are described in detail herein.

The computer 14 can supply the data signals in English or metric units of measure as selected and desired by a cyclist, for example, displaying the speed in miles per hour (M/h) or kilometers per hour (KM/h). Upon selection of the desired units of measure, which the unit 10 can be toggled between the two, the display device 30 can display each using appropriate symbols in the speed 54 display field. The unit of measure typically is set upon initial installation, but can be accessed at any time, by using the mode button 22 to enter the setup or initialization mode and the set button 20 to select either metric or English units of measure.

The wheel size setting 76 and 78 also is typically accessed upon initial installation. The wheel size setting value or number is equal to the distance, in millimeters, that the wheel travels during one complete revolution. Each time the wheel magnet passes the sensor on the fork, the sensor 12 supplies a pulse signal for each completed revolution. Three methods can be used to determine the wheel size setting: (i) measure the actual distance that the wheel travels in one complete revolution ("wheel roll out"); (ii) measure the wheel and tire radius (for example, measure the radius in mm and multiplied by 6.2832=Wheel setting); and (iii) refer to a table of common tire sizes and input the corresponding number of the wheel size setting. Using the pulse signal and the wheel setting, the computer 14 calculates a velocity or speed of this distance vs. time to give accurate readings for the various modes. The computer 14 can store two wheel settings 76 and 78 in memory which is advantageous to eliminate reprogramming when switching tires or bikes, and, if an additional sensor assembly 12 is used, to allow for using the unit 10 on a second bicycle.

In any mode, the odometer 60 and wheel setting fields 76 and 78 can be changed by pressing and holding the set and mode buttons 20 and 22 until the M/h or KM/h symbol flashes, for example, for about four seconds. After computer 14 is set up, the computer 14 will use the selected wheel size setting 76 or 78 for calculations. Changing between fields 76 and 78 is performed in any mode by using the set button 20 until the wheel setting input number is displayed on the middle portion with a corresponding "1" or "2" being displayed in the upper portion such as by holding for 3-4 seconds.

For example, after inserting the battery 26 and choosing M/h or KM/h, the computer 14 will display 2124 with the 4 digit flashing. The wheel setting fields 76 and 78 display a "1" or a "2", which appear in the upper portion of the screen to designate wheel setting number one and two, respectively. The set button 20 is used to increase the flashing number and the mode button 22 is used to lock in the selection and to advance to the next flashing digit. In this manner, all four digits can be adjusted. After adjusting the final digit, the mode button 22 is depressed until the display 30 stops flashing, such as for about two seconds. Similarly, the second wheel setting corresponding to the "2" can be set. The unit 10 includes a settable odometer 60 which advantageously provides for manually setting the odometer 60 to transfer mileage from another computer or to re-input mileage lost because power loss of the battery 26. The unit 10 will display the current odometer reading with the last digit on the fight flashing. The set button 20 is used to increase the flashing digit and the mode button 22 is used to select and advance to the next flashing digit until all digits are adjusted. Once adjusted, the mode button 22 is used to advance to a normal operating mode as shown in FIGS. 2a–2e. If a change is not needed for either of the wheel setting or the odometer, holding the mode button 22, for example, for five seconds, allows the unit 10 to bypass the setting mode and advance to normal operating mode.

The a time of day (TOD) clock 62 can be similarly set using the mode button 22 in the normal operating mode. The set button 20 can be used to select and set the hour and minutes. For example, press and hold down the set button 20 for about 2 seconds or until a flashing 12 appears. Use the set button 20 to increase the flashing hour digits by one or hold for rapid advance and use the mode button 22 to lock in the choice and to advance to the flashing minute digits. Repeating the above procedure one can adjust and set the clock 62 until all digits are adjusted, then using the mode button 22 one can return to normal operating mode. Additionally, the computer 14 includes a temperature sensor 13 which can be enclosed in the unit 10 for generating a temperature signal for display in the temperature 64 display field that represents the temperature of ambient air and the like.

Referring to FIGS. 2a–2e, the displays and functions of the unit 10, while operating and providing operating data signals, it is now described. The unit 10 is configured to automatically turn on and begin recording data in a normal operating mode whenever the wheel sensor is activated by wheel rotation. Likewise, the unit 10 will automatically stop recording data when the wheel stops rotating. Additionally, the LCD display 30 will automatically shut itself off after a predetermined period of time, for example, after 5–6 minutes of non-use. However, the unit 10 can be configured to continuously display the clock 62 and the temperature 64 display fields during periods of inactivity. The display 30 also can be activated when one of the set buttons 20 and mode buttons 22 are depressed or when the wheel sensor is activated by wheel rotation.

Figure 2A:
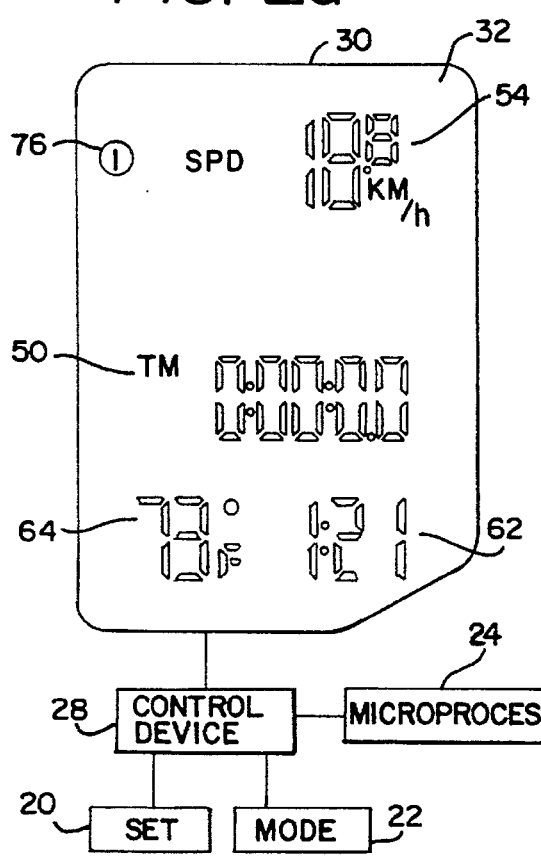

As shown in FIG. 2a, the unit 10 includes a time display screen 32 for displaying the operational data signals when operating and displaying the timer 50. The display 30 generally displays three (3) rows of operating data signals in a upper, middle and lower portions of the display 30. In screen 32, the upper portion displays one of the wheel settings 76 or 78. Additionally, the current speed 54 is displayed in M/h or KM/h and has a display range of 3–99.9 M/h or 4.5–122 KM/h. The display 30 can display the current speed 54 in a resolution of 0.5 M/h or KM/h. The middle portion displays the trip timer 50, as indicated by the "TM" symbol defined as the total time the bicycle is in motion. The wheel setting symbol 76 or 78 can be configured to blink on and off when the timer 50 is running. The unit 10 is configured to display the elapsed time, to start the timer 50 when the wheel rotates, and, likewise, to stop the timer when the wheel stops. The timer 50 is configured with a resolution to record up to 9:59:59 hours (hrs.) and to recycle to 0:00:00 hrs. The lower portion displays the clock 62 and temperature 64. The time of day 62 display field can be configured to display the time in a twelve (12) hour format and to indicate the passage of time, for example, the counting of each second, using a flashing colon between the hour and minute digits or as is conventionally known in the art.

Figure 2B:
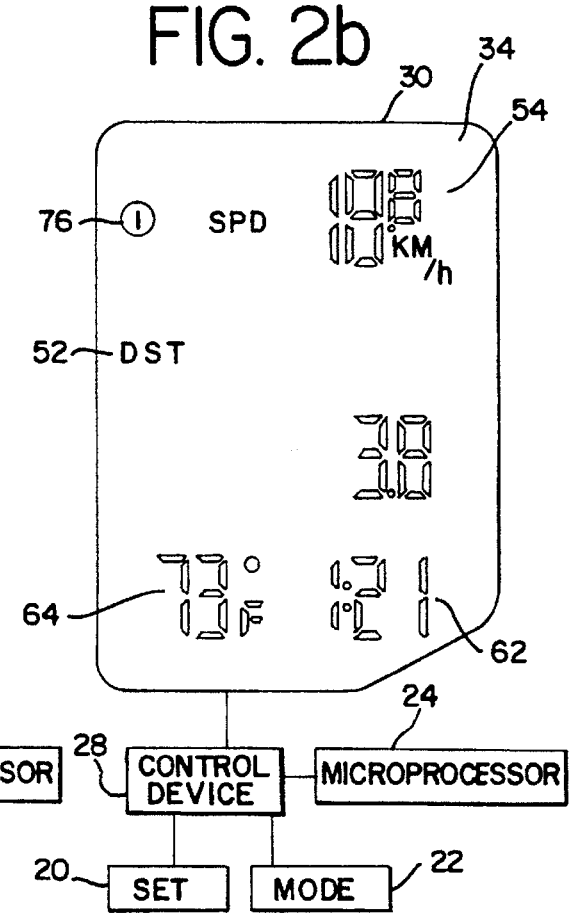

Referring to FIG. 2b, the distance display screen 34 of display 30 includes an upper portion having the wheel setting 76 and current speed 54 displayed as described above. The middle portion displays a trip distance 52 as indicated by the "DST" symbol defined as the total distance the bicycle has traveled. The microprocessor 24 computes and records the trip distance 52 in increments of 0.1 miles (or kilometers) whenever the wheel rotates. The trip distance 52 can be configured to record up to 1,000 miles (or kilometers) and to reset to zero (0), for example, recording up to 9999.9 miles (or kilometers). As above, the lower portion continuously displays the 12 hour clock 62 and temperature 64.

As shown in FIG. 2c, the average speed screen 36 of the display 30 illustrates the display of operational data signals representing the average speed mode. The display 30 displays the wheel settings 76 or 78, the speed 54, the clock 62 and the temperature 64, as described above. The average speed screen 36 is actuated by depressing the mode button 22 twice, thereby advancing from screen 32 to screen 36. The middle portion displays the average speed 56 as indicated by the "AV" symbol defined the average speed of the bicycle while in motion. The unit 10 can be configured to calculate the average speed in increments of 0.1 M/h or KM/h, whenever the wheel is rotating. The control device 28 can be configured to control the microprocessor 24 to calculate the average speed 56, for example, for up to twenty-five (25) hours and then to automatically reset the average speed 56 to zero (0). The average speed 56 is calculated from the pulse signal rate 4.

Referring to FIG. 2d, the maximum speed screen 38 of the present invention is entered to by depressing the mode button 22 three times. The upper and lower portions of display 30 continue to display the current speed 54, wheel setting 76 or 78, clock 62 and temperature 64, as described above. The middle portion is configured to display the maximum speed 58 as indicated by the "MX" symbol defined as the maximum speed the bicycle attained while in motion. The unit 10 can be configured to compute and record a maximum speed 58, for example, in the range between zero (0) and up to 99.9 M/h or 1.22 KM/h. The control 28 is adapted to control the microprocessor 24 so as to compute and calculate a maximum speed whenever a maximum speed is maintained for a predetermined period of time, such as upon attaining a new maximum speed for 2 seconds. The maximum speed can be displayed in a resolution of 0.1 M/h (or KM/h).

As shown in FIG. 2e, the odometer screen 40 of the display 30 is entered by depressing the mode button 22 four times. In the odometer screen 40, the upper and lower portions of display 30 remained unchanged, as described above. The middle portion of display 30 displays the odometer 60 as indicated by the "ODO" symbol. The odometer 60 of the unit 10 is adapted to record distance, in increments of 1.0 miles or kilometers, whenever the wheel is rotating. The unit 10 can be configured to record up to 9,999.9 miles or kilometers and then to automatically reset to zero (0). The control 28 controls the microprocessor 24 so as to continually add to a total distance traveled by the bicycle. As above, the odometer 60 can advantageously be configured to change the odometer setting by utilizing the set button 20 and the mode button 22, respectively, so as to transfer the recorded odometer data from one bike to another, or to reestablish odometer data, if the battery has worn out. Depressing the mode button 22 a fifth time returns the unit 10 to the display of FIG. 1. In operation, the mode button 22 is used to display operational data signals which are displayed in the middle portion of display 30 in the normal operating mode. Actuation of the mode button 22 selects the appropriate screens 32, 34, 36, 38 and 40 representing data information of the trip timer 50, distance 52, average speed 56, maximum speed 58, and odometer 60, respectively. More specifically, in the normal operating mode, each time the mode button 22 is depressed, the display 30 is changed in the order of "auto trip timer" screen 32→"trip distance" screen 34→"average speed" screen 36→"maximum speed" screen 38→"odometer" screen 40. In any of the screens 32 through 40, the values for the operational data signal of "TM", "DST", "AV", and "MX", can be reset by simultaneously holding the set button 20 and the mode button 22 for a predetermined duration such as for about one (1) second. The display 30 will flash and reset these values to zero (0). Likewise, the initial setup mode can be accessed by holding simultaneously set button 20 and mode button 22 for a longer duration, for example, 3 to 4 seconds and, if accessed by mistake, one can exit to the normal operating mode.

Referring to FIGS. 3a–3d, the workout window mode of the present invention is described. The workout window mode includes screens 42, 44, 46 and 48, for allowing the cyclist to accumulate a second separate set of data for a workout timer 68, a workout distance 70, a workout average speed 72 and a workout maximum speed 74. In this manner, workout data signals can be computed by the computer 14 and displayed by display 30 to advantageously provide a measurement of true performance during the cyclist's workout portion. The workout window mode is operated manually so that the user can choose when to start and to stop the accumulation of the second set of data. The workout data can be cleared at any time without affecting the cumulative operating data from being computed and recorded in the normal operating mode of unit 10. The workout window mode is accessed by holding the mode button 22 until the "WW" symbol 66 is displayed in the upper portion of display 30. Additionally, the middle portion of display 30 is "windowed" utilizing the symbols 80 conventionally represented by corner brackets. The unit 10 can be configured to toggle between the normal operating mode and the workout window mode during the workout or when calculating and recording workout data by depressing the mode button 22 until the display 30 reverts back to the normal operating mode. Thus, the unit 10 of the invention can advantageously compute and display operational data signals and separately compute and display workout data signals to provide an accurate measure of the true performance of a cyclist's workout.

Referring to FIG. 3a, the workout timer screen 42 of display 30 displays a workout timer 68 as the first screen when the workout window mode is accessed. The workout timer 68 is configured to compute and record a period of time or "workout" that is manually actuated by the cyclist. Other predetermined information of the average and maximum speeds, and the distance are determined using the workout time, thereby generating speeds and distances for the workout. The control 28 is responsive to the mode button 22 so as to control the microprocessor 24 thereby starting and stopping the accumulation and recording of the second set of dam, i.e. the workout data signal. The workout data signals are supplied from the microprocessor 24 to the control device 28 and are displayed on display 30 in screen 42-48. As above, the workout timer 68 is manually operated and can be configured to start and stop only while in the workout window mode. The unit 10 is adapted to compute the second set of data for the workout window mode when the workout timer 68 is engaged. To start the timer 68, the set button 20 is depressed and the unit 10 can be configured to flash the WW symbol 66 on and off to indicate that the timer 68 is running. When the timer 68 is engaged, a workout data signal having data information of the workout timer 68, workout distance 70, workout average speed 72 and workout maximum speed 74 is computed and recorded. By depressing and holding the mode button 22, the control unit 28 reverts to display operational data in the normal operating mode having the WW symbol 66 illuminated. The WW symbol 66 alerts the cyclist that the timer 68 is on. The unit 10 is adapted to display the bracketed portions 80 only when in any of the screens 42-48 of the workout window mode. Using the mode button 22 again can return the cyclist to the workout window mode. In order to stop the timer 68, the user depresses the set button 20, whereby the "WW" symbol 66 will stop flashing and the microprocessor 24 will stop computing the second set of data information, i.e. the workout data signal. By depressing the mode button 22 for a short duration, the unit 10 is configured to switch from screen 42 to screen 44 to display the data of the workout distance 70 indicated by the "DST" symbol. Similarly, depression of the mode button 22 twice displays screen 46 displaying the workout average speed 72 indicated by the "AV" symbol. Additionally, depressing the mode button 22 a third time displays screen 48 having the workout data for the workout maximum speed 74 indicated by the "MX" symbol. In this manner, depressing the mode button 22, a user can cursor through the screens 42-48 and view the workout data for the workout timer 68, workout distance 70, workout average speed 72 and workout maximum speed 74. The workout data signal is displayed and is advantageously indicted by the WW symbol 66, which can advantageously be configured to blink or flash on and off when in the workout window mode so as to indicate that the sensor 12 is sending the pulse signal to the computer 14. The cyclist can view any of the workout data whether the timer 68 is on or off. Throughout the operation of the workout window mode, the upper portion of display 30 continues to display the current speed 54, wheel setting 76 or 78 and the lower portion continues to display the clock 62 and temperature 64. Finally, the workout window mode can reset the second set of data to zero (0) by depressing and holding buttons 20 and 22 until the display resets to zero (0), for example, for about one (1) second. Resetting the workout window mode data does not affect the calculation of operational data being generated for the normal operating mode.

In operation, the mode button 22 is used to display workout data signals in the middle portion of display 30 of the workout window mode. Actuation of the mode button 22 selects the appropriate screens 42, 44, 46, and 48 representing data information of the workout timer 68, workout distance 70, workout average speed 72 and workout maximum speed 74, respectively. More specifically, in the workout window mode, each time the mode button 22 is depressed, the display 30 is changed in the order of "workout timer" screen 42→"workout distance" screen 44→"workout average speed" screen 46→"workout maximum speed" screen 48→and return to screen 42. The cyclist can view any of the workout data whether the timer 68 is on or off.

In any of the screens 42 through 48, the values for the workout data signal of "TM", "DST", "AV", and "MX", can be reset to zero (0) by simultaneously holding the set button 20 and the mode button 22 for a predetermined duration such as for about one (1) second. In this manner, the present invention can advantageously provide for calculating the workout data, displaying the workout data, and being able to reset the workout data at any time during the operation of the unit 10 without interfering with the separate collection of operational data of the normal operating mode. Workout data from a workout period remains in the memory of the computer 14 until being reset. This is advantageous in that the cyclist can ride one day, collect workout data, and then review the workout data before resetting and collecting new workout data. One advantage of collecting a separate set of workout data is that the cyclist can ride safely through traffic knowing that the workout can be started when the open road is reached. Collecting a separate set of workout data increases the accuracy of the data information displayed in the workout window mode, which reduces any motivation for the cyclist to forego a proper warm up and cool down to enhance the computed average speed as may occur using conventional units. Thus, the unit 10 of the present invention can provide a true average speed, which is particularly advantageous when trying to obtain increased performance such as during interval training, time trials, or even sprints, without losing cumulative riding data.

Although embodiments of the present invention have been described in detail herein with reference to the accompanying drawings, it will be apparent that the invention is not limited thereto, and that various changes and modifications may be effected therein by one skilled in the art without departing from the spirit and scope of the invention as defined in the appended claims.

What is claimed is:

1. A data display unit for a bicycle, comprising:
   wheel rotation sensor for generating plural pulse signals at a rate corresponding to the rotary speed of a wheel of the bicycle;
   computing means responsive to said pulse signals for generating an operational data signal and a workout data signal of a plurality of predetermined information when said pulse rate is greater than zero, said computing means being adapted to generate said workout data signal separate from said operational data signal;
   display means for displaying said predetermined information of each of said operational data and workout data signals, said display means having a plurality of screens for displaying said predetermined information, wherein each of said screens include a plurality of display fields for displaying each of said predetermined information for said operational data signal and workout data signal; and
   control means for controlling the calculation and display of said operational and workout data signals of the unit, said control means connected to said computing means for controlling the operation of the unit in a normal operating mode and in a workout window mode, said control means operating to supply said display means said predetermined information of said operational data signal in said plural fields when in said normal operating mode, said control means operating to supply said display said workout data signal in said plural fields when in said workout window mode, said control means adapted to generate and display separately said predetermined information for said operational data signal and said workout data signal;

said normal mode calculating and maintaining cumulative data so long as said unit is energized;

said cumulative data including a cumulative average speed, a cumulative maximum speed and cumulative distance and selectively displaying data representing said cumulative speeds and distance;

said workout window mode calculating a workout average speed, a workout maximum speed and a workout distance and selectively displaying data representing said workout speeds and distance:

said normal mode data and said workout window mode data being independently calculated and maintained so that said workout window mode may be selected, cleared, and reset without clearing or resetting said cumulative data.

2. The data display unit of claim 1, wherein said predetermined information of said operational data signal includes timing data information for generating a trip time.

3. The data display unit of claim 2, wherein said predetermined information of said operational data signal further includes distance data information for generating a distance traveled by the bicycle.

4. The data display unit of claim 3, wherein said predetermined information of said operational data signal includes speed data information for generating a current speed of the bicycle.

5. The data display unit of claim 1, wherein said predetermined information of said workout data signal includes timing data information for generating a workout time.

6. The data display unit of claim 5, wherein said predetermined information of said workout data signal includes distance data information for generating a workout distance traveled by the bicycle.

7. The data display unit of claim 6, wherein said predetermined information of said workout data signal includes speed data information for generation a workout speed, a workout average speed, and a workout maximum speed of the bicycle.

8. The data display unit of claim 7, wherein said predetermined information of said workout data signal includes data information for an odometer.

9. The data display unit of claim 8, wherein said predetermined information of said workout data signal includes data information for a time of day clock.

10. The data display unit of claim 9, wherein said predetermined information of said workout data signal includes data information for a temperature of ambient air.

11. The data display unit of claim 10, wherein said predetermined information of said workout data signal includes data information for at least one wheel size setting, said wheel size setting adapted to provide a measurement of the distance the bicycle travels in one revolution of a wheel thereof.

12. The data display unit of claim 1, wherein said control means includes input means for inputting values of operational data information for said predetermined information of an odometer, a time of day clock and at least one wheel size setting, whereby said input means is adapted to set said values for said odometer, said time of day clock and said wheel size setting and to store said values in a memory of said computing means.

13. The data display unit of claim 1, wherein said control means includes a selection means for selecting a desired one of said plurality screens for displaying said predetermined information.

14. The data display unit of claim 1, wherein said display means is adapted to display said operational data signal in said plurality of display fields of said screens, said screens of said display means having an upper portion, a middle portion and a lower portion, said upper portion configured to display a wheel setting field, a current speed display field and a workout window mode symbol, said middle portion configured to display each of a timer display field, a distance display field, an average speed display field, and a maximum speed display field, and said lower portion configured to display a clock display field and a temperature display field.

15. The data display unit of claim 14, wherein each of said screens of said display means operating in said normal operating mode includes said workout window mode symbol to indicate the actuation of said workout window mode, whereby said control means displays said workout window mode symbol whenever said workout data signal is being calculated and stored.

16. The data display unit of claim 15 wherein said workout window symbol of said upper portion indicates the actuation of said workout window mode by pulsing on and off.

17. The data unit of claim 16, wherein said middle portion of said display means is configured to operate in said workout window mode and display said workout data signal information in said middle portion of said display, said middle portion having bracket means for indicating the display of said predetermined information of said workout data signal.

18. The data display device unit of claim 1, wherein said predetermined information of said workout data signal can be reset separate from said predetermined information of said operational data signal while the unit is operating in said workout window mode.

19. The display device unit of claim 1, wherein said display means is adapted to display independently said predetermined information of said workout data signal.

20. A data display unit for a bicycle, comprising:

power means for supplying a source of electricity to the data display unit;

pulse signal means for providing a timing signal responsive to the time it takes the bicycle to travel a predetermined distance;

calculating means responsive to said timing signal for calculating each of an operational data signal and a performance data signal when said timing signal is greater than zero, said operational data signal includes a timer, a running speed, a running distance, a cumulative distance, a cumulative average speed, and a cumulative maximum speed of the bicycle, and said performance data signal includes a workout time, a workout distance, a workout average speed and a workout maximum speed;

display means adapted to display said operational and performance data signals calculated by said calculating means, said display means adapted to display said operational data signal in display fields of a plurality of operational screens, said display means adapted to display said performance data signal in display fields of a plurality of workout screens; and control means for controlling the operation of said calculating means and said display means, said control means adapted to display said operational data signal when the bicycle is in motion, said control means adapted to cause said calculation means to calculate said performance data when desired by a user, said control means having a selecting means for selecting between said screens of the normal operating mode and said workout window mode and for selecting between a start or stop condition of said control means;

wherein said cumulative data is maintained so long as the unit is energized and said workout window mode data are maintained only so long as said workout window mode is selected and said data are not cleared.

21. The data display unit of claim 20, wherein said performance data signal representing an accurate time, distance, average speed, and maximum speed of a cyclist's workout.

22. The data display unit of claim 21, wherein said control means is adapted to indicate the actuation of said performance data signal.

23. The data display unit of claim 22, further including temperature sensor means for sensing a temperature of the air relative to the unit, said sensor means providing a temperature signal to said computing means whereby said computing means supplies a temperature data signal to said control means for display on said display means.

24. The data display unit of claim 23, wherein said control means causes said calculating means to compute said performance data for display on the display means.

25. The data display device of claim 1, wherein said control means is configured to cause said computing means to reset said workout data independent of causing said computing means to reset said operational data.

26. A data display unit for a bicycle, comprising:

a wheel rotation sensor for generating plural pulse signals at a rate corresponding to the rotary speed of a wheel of the bicycle;

a computer for generating a first data signal and a second data signal when said pulse rate is greater than zero, said first data signal and said second data signal being generated from said pulse signals, said computer being adapted to generate said second data signal separate from said first data signal;

a display which displays said predetermined information of each of said first data and second data signals, said display having a plurality of screens for displaying said predetermined information, wherein each of said screens include a plurality of display fields for displaying each of said predetermined information for said first data signal and second data signal; and a control which controls the calculation and display of first and second data signals of the unit, said control connected to said computer for controlling the operation of the unit in a normal operating mode using said first data signal and in a workout window mode using said second data signal, said control operating to supply said display means said predetermined information of said first dam signal in said plural fields when in said normal operating mode, said control operating to supply said display said second data signal in said plural fields when in said workout window mode, said control adapted to generate and display separately said predetermined information for said first data signal and said second data signal, said normal mode calculating and maintaining cumulative data so long as said unit has electrical power, said cumulative data including a cumulative speed and cumulative distance and said plural fields selectively displaying data representing said cumulative speed and distance;

said workout window mode calculating a workout speed and a workout distance and said plural fields selectively displaying data representing said workout speed and distance;

said normal mode data and said workout window mode data being independently calculated and maintained so that said workout window mode may be selected, cleared, and reset without clearing or resetting said cumulative data.

* * * * *